(12) United States Patent
Bellert

(10) Patent No.: US 10,083,218 B1
(45) Date of Patent: Sep. 25, 2018

(54) REPAIRING TABLES

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/639,205

(22) Filed: Jun. 30, 2017

(51) Int. Cl.
*G06F 12/00* (2006.01)
*G06F 17/00* (2006.01)
*G06F 17/30* (2006.01)
*G06F 3/06* (2006.01)

(52) U.S. Cl.
CPC ...... *G06F 17/30595* (2013.01); *G06F 3/0601* (2013.01); *G06F 12/00* (2013.01); *G06F 17/00* (2013.01); *G06F 2003/0697* (2013.01)

(58) Field of Classification Search
None
See application file for complete search history.

(56) References Cited

U.S. PATENT DOCUMENTS

| | | | | |
|---|---|---|---|---|
| 2005/0063592 A1* | 3/2005 | Li | ...................... | G06K 9/00476 382/181 |
| 2009/0245645 A1* | 10/2009 | Xing | ..................... | G06F 17/245 382/189 |
| 2014/0240322 A1* | 8/2014 | Brumer | ................. | G06T 11/203 345/442 |
| 2016/0012302 A1* | 1/2016 | Koborita | ............. | G06F 3/04842 715/764 |

* cited by examiner

*Primary Examiner* — Kee M Tung
*Assistant Examiner* — Yanna Wu
(74) *Attorney, Agent, or Firm* — Osha Liang LLP

(57) ABSTRACT

A method for image processing is provided. The method includes: obtaining an image including a table; generating a skeleton graph associated with the table and including a plurality of edges; identifying a first terminal vertex on the plurality of edges; generating a first region of interest for the first terminal vertex; determining a first target within the first region of interest; and repairing the table by adding a first artificial edge between the first terminal vertex and the first target to the skeleton graph.

17 Claims, 13 Drawing Sheets

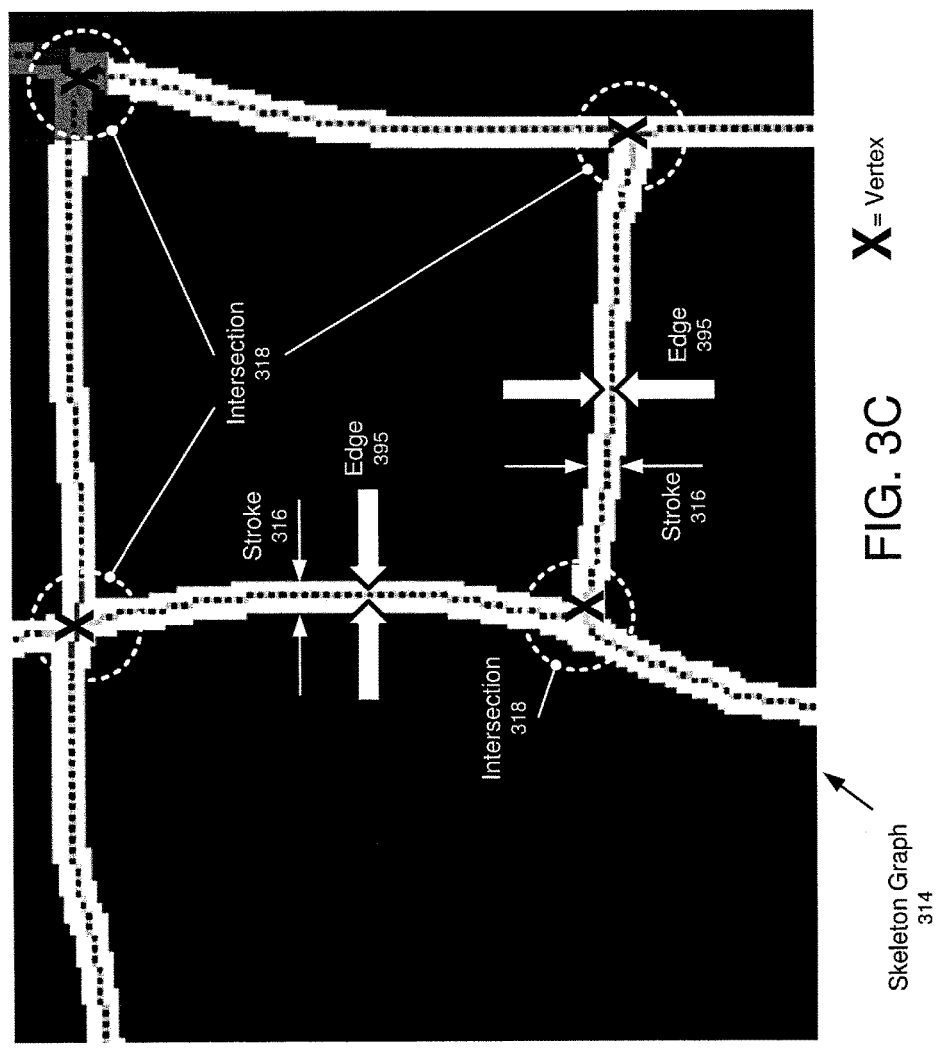

Hand-drawn Table
402

Hand-drawn Table
402

FIG. 4H

REPAIRING TABLES

BACKGROUND

An image may include a table with rows and columns bounded by hand-drawn lines. For example, the image may be a scan of a hand-drawn page. As another example, the image may be a photograph of a writing board on which a table has been drawn with markers. These hand-drawn lines are rarely straight, making it difficult for image processing devices to determine the geometry of the table (e.g., upper left corner, extents, number of rows and columns, cell positions). These hand-drawn lines also make it difficult to generate a high-level representation of the table that can be included in an electronic document (e.g., word processing document, spreadsheet, slide show, webpage, etc.). Regardless, users still wish to have image processing devices operate on hand-drawn tables or any table in an image.

SUMMARY

In general, in one aspect, the invention relates to a method for image processing. The method comprises: obtaining an image comprising a table; generating a skeleton graph associated with the table and comprising a plurality of edges; identifying a first terminal vertex on the plurality of edges; generating a first region of interest for the first terminal vertex; determining a first target within the first region of interest; and repairing the table by adding a first artificial edge between the first terminal vertex and the first target to the skeleton graph.

In general, in one aspect, the invention relates to a system for image processing. The system comprises: a memory; and a computer processor connected to the memory that: obtains an image comprising a table; generates a skeleton graph associated with the table and comprising a plurality of edges; identifies a first terminal vertex on the plurality of edges; generates a first region of interest for the first terminal vertex; determines a first target within the first region of interest; and repairs the table by adding a first artificial edge between the first terminal vertex and the first target to the skeleton graph.

In general, in one aspect, the invention relates to a non-transitory computer readable medium (CRM) storing computer readable program code embodied therein. The program code, when executed: obtains an image comprising a table; generates a skeleton graph associated with the table and comprising a plurality of edges; identifies a first terminal vertex on the plurality of edges; generates a first region of interest for the first terminal vertex; determines a first target within the first region of interest; and repairs the table by adding a first artificial edge between the first terminal vertex and the first target to the skeleton graph.

Other aspects of the invention will be apparent from the following description and the appended claims.

BRIEF DESCRIPTION OF DRAWINGS

FIGS. 3A-3C show an implementation example in accordance with one or more embodiments of the invention.

FIGS. 4A-4H show an implementation example in accordance with one or more embodiments of the invention.

DETAILED DESCRIPTION

Figure 1:
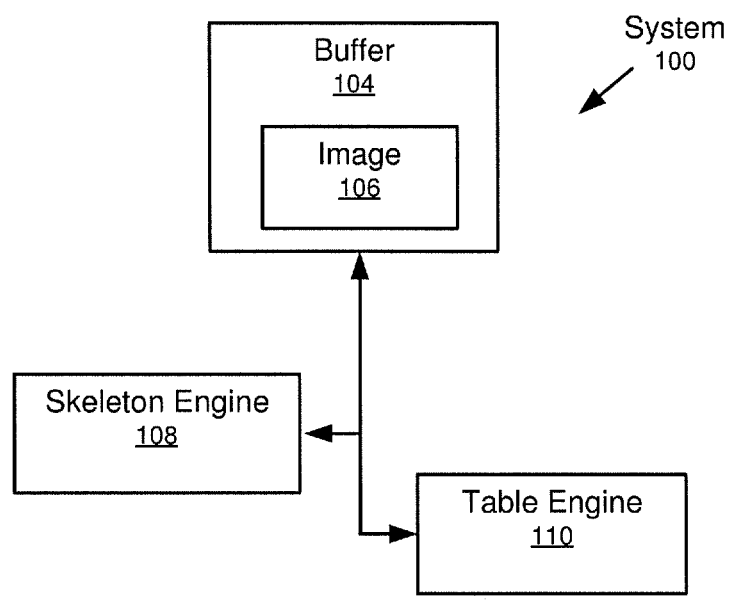
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. Specifically, an image including a table is obtained and the image is converted into a mask. The lines forming the rows and columns of the table may have imperfections. For example, in the case of a table that is drawn using a marker, the imperfections may be dropouts (i.e., disconnections between or within the lines of the table) caused by sloppy drawing and/or caused by the fading of the marker. In order to mend these errors, a skeleton graph for the table is generated. The skeleton graph includes edges and vertices representing the table. The edges and vertices are used to determine portions of the table that can be repaired through the addition of artificial edges. For example, an artificial edge can be built between two positions (e.g., pixels) on the skeleton graph to establish a near linear connection, a near perpendicular connection, or a corner connection. By repairing the table, it is more likely that the additional processes that operate on the table will be able to correctly generate a high-level representation of the table for inclusion in an electronic document (e.g. OOXML document, PDF document, etc.).

FIG. 1 shows a system (100) in accordance with one or more embodiments of the invention. As shown in FIG. 1, the system (100) has multiple components, including, for example, a buffer (104), a skeleton engine (108), and a table engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the system (100) includes the buffer (104). The buffer (104) may be implemented in hardware (i.e., circuitry), software, or any combination thereof. The buffer (104) is configured to store an image (106) including a table having any number of rows and columns. Each cell of the table may have text and/or graphics. The image (106) may be obtained (e.g., downloaded, scanned, etc.) from any source. Further, the image (106) may be of any size and in any format (e.g., JPEG, GIF, BMP, PNG, etc.). In one or more embodiments, the image (106) includes a writing board (e.g., blackboard, whiteboard, etc.), and the table is drawn on the writing board with a marker. In one or more embodiments of the invention, the table has one or more dropouts resulting from the sloppy drawing of the table and/or the fading of the pen or marker used to draw the table.

In one or more embodiments of the invention, the system (100) includes the skeleton engine (108). The skeleton engine (108) may be implemented in hardware (i.e., circuitry), software, or any combination thereof. The skeleton engine (108) converts the image (106) to a mask (e.g., a binary image) to identify each hand-drawn line of the table and/or text characters in the table.

Those skilled in the art, having the benefit of this detailed description, will appreciate that a standard coordinate system for the image (106) may exist. However, if the hand-drawn table is rotated within the image (106), the axes of this standard coordinate system might not align with the rows and columns of the table. In one or more embodiments of the invention, the skeleton engine (108) establishes a custom coordinate system with perpendicular axes that closely align with the rows and columns of the table in the image (106). Alternatively, the table may be rotated to better align the rows and columns of the table with the standard coordinate system of the image (106).

In one or more embodiments of the invention, the image (106) includes one or more connected components. Each connected component may be a portion of the image (106) that can be drawn without lifting the pen/marker. For example, all the lines that form the rows and columns of the table may correspond to a connected component. As another example, only a subset of the lines that form the rows and columns of the table may correspond to a connected component (i.e., the table may be formed of multiple connected components). As yet another example, the content (e.g., text characters) within one cell of the table may form one or more connected components.

In one or more embodiments, the skeleton engine (108) generates a skeleton graph for all identified connected components. Alternatively, the skeleton engine (108) generates the skeleton graph only for the largest connected component (i.e., the connected component with the largest number of pixels) and subsequently generates skeleton graphs for smaller connected components when they are determined as potentially useful in repairing the table. This saves computing resources by avoiding the generation of skeleton graphs for portions of the table that are not necessary for repairing the table.

In one or more embodiments, the largest connected component may corresponds to the entire table. Alternatively, the largest connected component may only correspond to a portion of the table.

In one or more embodiments, a skeleton graph includes a series of edges and vertices. Each edge may correspond to a stroke, or a portion of a stroke, of the table. Each vertex may correspond to an intersection of two or more edges. Further, an edge may contain a path of pixels from one end of the stroke to the other end of the stroke, located approximately at the center of the stroke. The width of a path is one or more pixels.

In one or more embodiments of the invention, if the end of an edge is not connected to another edge, the pixel(s) at the end of the edge is referred to as a terminal vertex. In one or more embodiments of the invention, the intersection of only three edges is referred to as a T-intersection. The pixel(s) at the intersection of the three edges is also referred to as a terminal vertex.

In one or more embodiments of the invention, the system (100) includes the table engine (110). The table engine (110) may be implemented in hardware (i.e., circuitry), software, or any combination thereof. The table engine (110) is configured to repair the table.

In one or more embodiments of the invention, the table engine (110) scans the skeleton graph to identify all terminal vertices. The table engine (110) stores all identified terminal vertices in a data structure (e.g., array). The terminal vertices may be stored in any order. Alternatively, the terminal vertices are stored in the order of being identified by the table engine (110) starting from the first identified terminal vertex followed by the subsequent terminal vertices identified as the table engine (110) performs a clockwise or counter clockwise scan.

In one or more embodiments of the invention, the table engine (110) also iterates through the data structure of terminal vertices and initiates a table repairing process for each terminal vertex. The repairing processes includes generating a region of interest for each terminal vertex. The region of interest covers an area in a trailing direction of the terminal vertex. For example, in the case of a terminal vertex at the end of an unconnected edge, the trailing direction is the direction of the vector pointing from the Nth pixel before the end pixel to the end pixel on the edge's path of pixels. For example, N=5. Other values of N are also possible. As another example, in the case of a terminal vertex that corresponds to a T-intersection, the trailing direction is the direction of the vector that points to the pixel(s) at the intersection of the three edges, and starts on the stem of the T-intersection k pixels away from the intersection of the three edges on the edge's path of pixels. For example, k=5. Other values of k are also possible.

In one or more embodiments of the invention, the region of interest can have any shape (e.g., a circle, a cone, a triangle, a rectangle, a square, an ellipse) and the area covered by the region of interest is adjusted depending on how closely the table matches a template table (i.e., a theoretical table) with perfectly straight lines forming the rows and columns of the table. For example, for hand-drawn tables that are well-drawn, the area covered by the region of interest may be smaller and vice versa.

In one or more embodiments of the invention, in the event a skeleton graph was generated for each identified connected component, the table engine (110) identifies all skeleton graphs that fall within (i.e., overlap with) the region of interest. Alternatively, in the event that a skeleton graph was only generated for the largest connected component, the table engine (110) identifies all skeleton graphs plus connected components (that have not yet been skeletonized) that fall within (i.e., overlap with) the region of interest. A skeleton graph is generated for the one or more overlapping connected components.

In one or more embodiments of the invention, the table engine (110) identifies a plurality of positions on the identified skeleton graph within the region of interest and stores the plurality of positions in a different data structure (e.g., array) for each terminal vertex. In one or more embodiments of the invention, each position may be a single pixel on an edge's path of pixels. Each position may also be another terminal vertex. The plurality of positions may be sorted by distance from the terminal vertex, from the closest position to the most distant position. The distance between a terminal vertex and a position may be calculated as the Euclidean distance between the terminal vertex and the position. Additionally or alternatively, the length may also be identified by counting the number of pixels between the terminal vertex and the position.

In one or more embodiments, the table engine (110) iterates through the plurality of positions to select a target.

The target is selected based on the distance between the position and the terminal vertex and a type of connection formed by connecting the terminal vertex to each position. The type of connections may include, from highest priority to lowest priority, a near linear connection (i.e., collinear connection), a near perpendicular connection, and a corner connection. For example, in the event that the table engine (110) determines that a terminal vertex can establish a collinear connection with one position (i.e., a collinear position) and a perpendicular connection with a different position (i.e., a perpendicular position), the table engine (110) will prioritize the establishment of the collinear connection. The collinear connection, the perpendicular connection, and the corner connection will be discussed in further detail below in reference to FIGS. 4A to 4H.

In one or more embodiments of the invention, a quality threshold is used to prevent a false positive connection. Specifically, a quality score is calculated for each potential artificial edge and the quality score is compared against the quality threshold. If the quality score is below the quality threshold, the potential artificial edge is discarded (i.e., not added to the skeleton graph). Determination of the quality score is discussed below. The quality threshold may be adjusted based on how closely the table matches a template table. For example, for hand-drawn tables that are well-drawn, the quality threshold may be higher and vice versa. For example, the quality score may take on a range of [0, 1], and the quality threshold may be 0.82.

Consider a table that includes a stroke ("false stroke") that is not an actual row or column boundary (e.g., it is actually a text character, noise, etc.). Regardless, during the skeletonization process, an edge may be generated for this false stroke and the end of this edge may be classified as a terminal vertex. The quality threshold will prevent an artificial edge from being generated for this terminal vertex associated with the false stroke. This will be discussed in more detail below in reference to FIGS. 5A-5B.

In one or more embodiments of the invention, once a target is selected for a terminal vertex, an artificial edge is generated to repair the gap between the terminal vertex and the target (i.e., the artificial edge connects the terminal vertex to the target). Once a terminal vertex has been repaired, the terminal vertex is removed from the data structure storing the terminal vertices. If a terminal vertex is connected to another terminal vertex, both terminal vertices are removed from the data structure storing the terminal vertices. In one or more embodiments of the invention, a terminal vertex with no target is removed from the data structure storing the terminal vertices. If the target is located on a skeleton graph that is different from the skeleton graph having the terminal vertex, the skeleton graph having the target is added (e.g., combined with) the skeleton graph having the terminal vertex.

In one or more embodiments, in the event that the table engine (110) determines that there is an intervening edge (i.e., stroke) between the terminal vertex and a position suitable for a collinear connection and that the intervening edge is sufficiently perpendicular to a vector from the terminal vertex to the position, the table engine (110) will first generate the artificial edge from the terminal vertex to the intervening edge and then from the intervening edge to the position suitable for a collinear connection.

In one or more embodiments, after the table repairing process has been applied to all terminal vertices stored in the data structure, the table engine (110) scans the combined skeleton graph to determine if new terminal vertices have been generated. If a new terminal vertex is identified, the new terminal vertex is added to the data structure and the table engine (110) repeats the table repairing process for the new terminal vertex.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

Figure 2A:
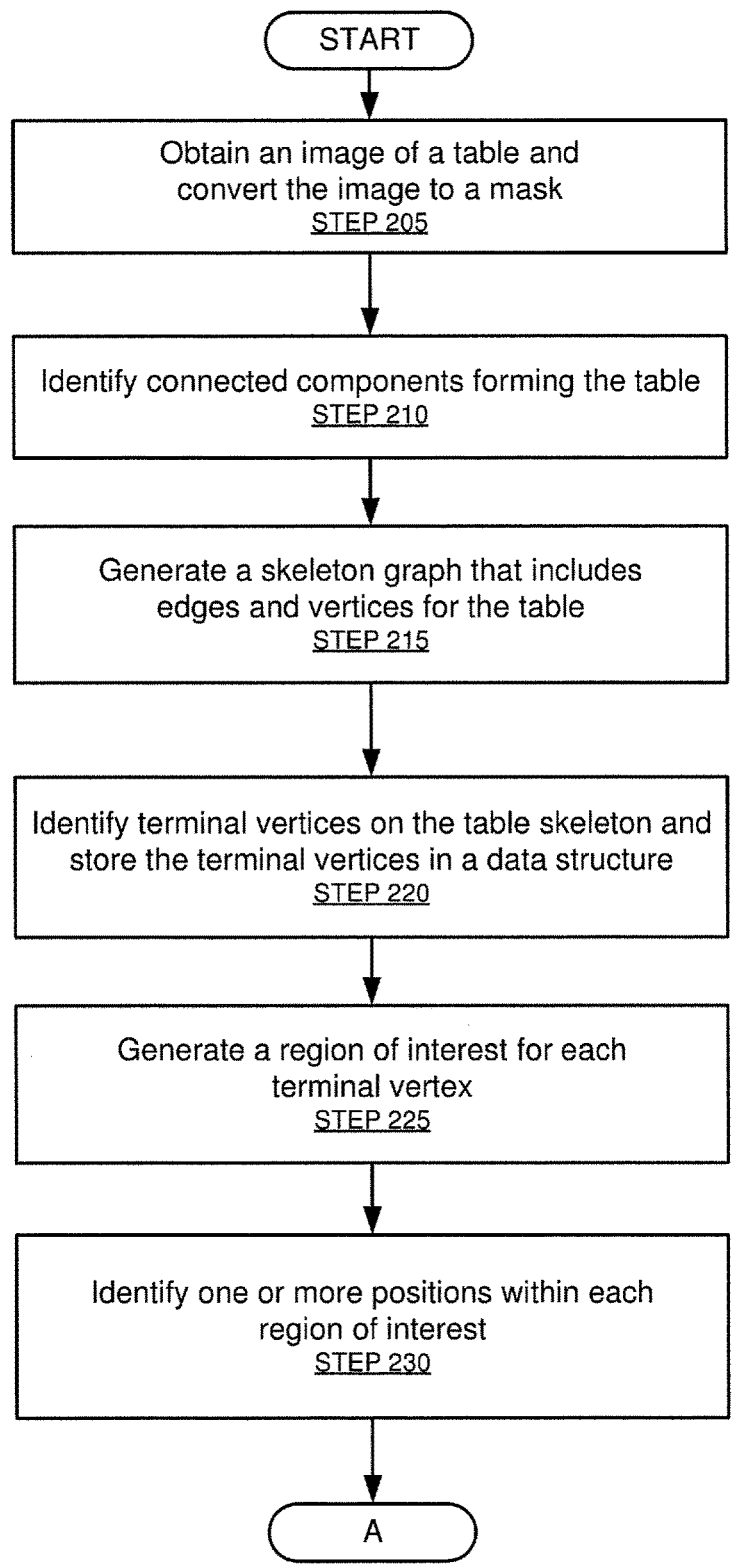
FIG. 2A and FIG. 2B show a flowchart in accordance with one or more embodiments of the invention.
Figure 2B:
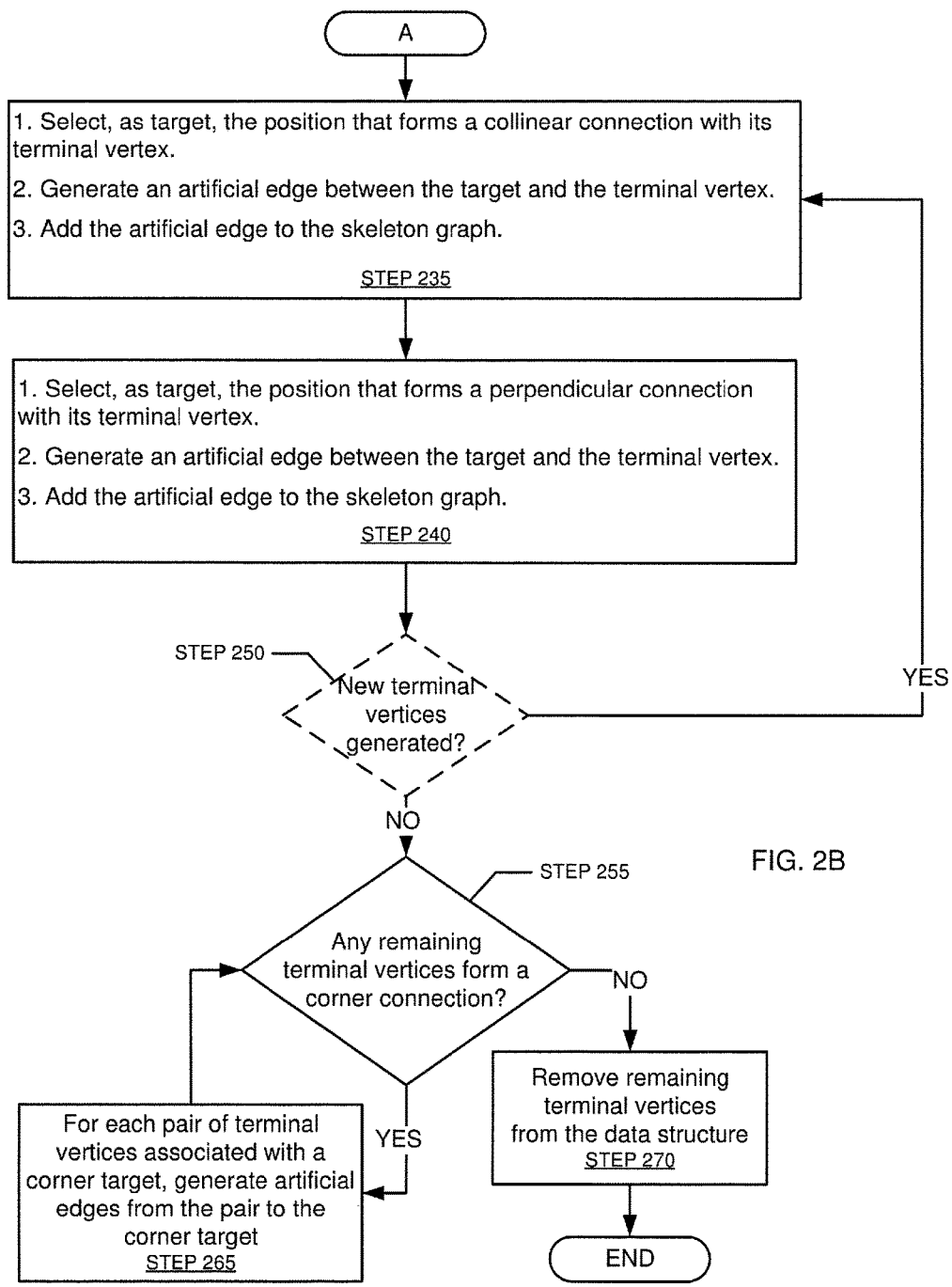

FIG. 2 shows a flowchart in accordance with one or more embodiments of the invention. The flowchart depicts a process for image processing. Specifically, the flowchart depicts a process for repairing broken lines in a table. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an image including a table is obtained (STEP 205). The image may be obtained (e.g., downloaded, scanned, etc.) from any source and may be of any size or format. In one or more embodiments, the table in the image is hand-drawn. In other words, the table has multiple strokes that represent hand-drawn lines that bound the rows and columns of the table. These hand-drawn lines are not perfectly straight. Further, each cell of the table may have hand-drawn text and/or graphics.

In one or more embodiments of the invention, the image is converted into a mask (e.g., a binary image) to identify each hand-drawn line of the table and/or text characters in the table. Pixels corresponding to the strokes of the table may be set to 1, while all remaining pixels are set to 0. Further, the custom coordinate system as described above in reference to FIG. 1 is established for the table. Alternatively, the table may be rotated to better align the rows and columns of the table with the standard coordinate system of the image.

In STEP 210, all connected components in the table are identified, as described above in reference to FIG. 1.

In STEP 215, a skeleton graph, as discussed above in reference to FIG. 1, is generated for the table. In one or more embodiments of the invention, a skeleton graph is generated for all connected components identified in STEP 210. Alternatively, the skeleton graph is generated for only the largest connected component identified in STEP 210.

In STEP 220, a plurality of terminal vertices are identified, as described above in reference to FIG. 1. Specifically, if the end of an edge is not connected to another edge, the pixel(s) at the end of the edge is identified as a terminal vertex. In one or more embodiments of the invention, the intersection of only three edges is referred to as a T-intersection. The pixel(s) at the intersection of the three edges is also identified as a terminal vertex.

In STEP 225, a region of interest is generated for each of the plurality of terminal vertices. The region of interest may take the shape of a cone, ellipse, triangle, etc. The size and/or shape of the region of interest may depend on how closely the table matches the template table with straight rows and columns. For example, if the table is well-drawn, a smaller size region of interest is suitable.

In STEP 230, multiple positions, as discussed above in reference to FIG. 1, are identified within the region of interest of each terminal vertex. In one or more embodiments, the positions for each terminal vertex are stored in a data structure (e.g., array) for that terminal vertex, as discussed above in reference to FIG. 1.

As discussed above, collinear connections are preferred over perpendicular connections. Accordingly, in STEP 235, a position that can form a collinear connection with its terminal vertex is selected as the target. Then, an artificial edge between the target and its terminal vertex is generated and added to the skeleton graph, as discussed above in reference to FIG. 1. If the artificial edge crosses an intervening edge in the region of interest, and if the artificial edge forms a near perpendicular connection with the intervening edge, then the artificial edge is partitioned into two parts. One part is from the terminal vertex to the intervening edge. The second part is from the intervening edge to the target. The terminal vertex is removed from the data structure storing the terminal vertices. If the target is also a terminal vertex, then it is removed from the data structure storing the terminal vertices. If the target is located on a skeleton graph that is different from the skeleton graph having the terminal vertex, the skeleton graph having the target is added (e.g., combined with) the skeleton graph having the terminal vertex.

In STEP 240, for the remaining terminal vertices, a position that can form a perpendicular connection with its terminal vertex is selected as the target. Then, an artificial edge between the target and its terminal vertex is generated and added to the skeleton graph, as discussed above in reference to FIG. 1. If the target is located on a skeleton graph that is different from the skeleton graph having the terminal vertex, the skeleton graph having the target is added (e.g., combined with) the skeleton graph having the terminal vertex.

In one or more embodiments, a terminal vertex that is not connected to a target during STEP 235 or STEP 240 is removed from the data structure.

In STEP 250, a new scan is conducted on the possibly combined skeleton graph to identify new terminal vertices. These new terminal vertices are the result of combining skeleton graphs in STEP 235 and STEP 240.

When it is determined that new terminal vertices exist, the process returns to STEP 235. When it is determined that no new terminal vertices exist, the process proceeds to STEP 255.

In STEP 255, it is determined whether any of the remaining terminal vertices (i.e., terminal vertices that could not form a collinear connection or a perpendicular connection) are able to form a corner connection, as discussed below with respect to FIG. 4G.

When it is determined that a remaining terminal vertex does not form a corner connection, the terminal vertex is removed from the data structure in STEP 270. When it is determined that one or more pairs of remaining terminal vertices can form a corner connection, the process proceeds to STEP 265 to generate artificial edges from the pairs to the corner targets.

Figure 3A:
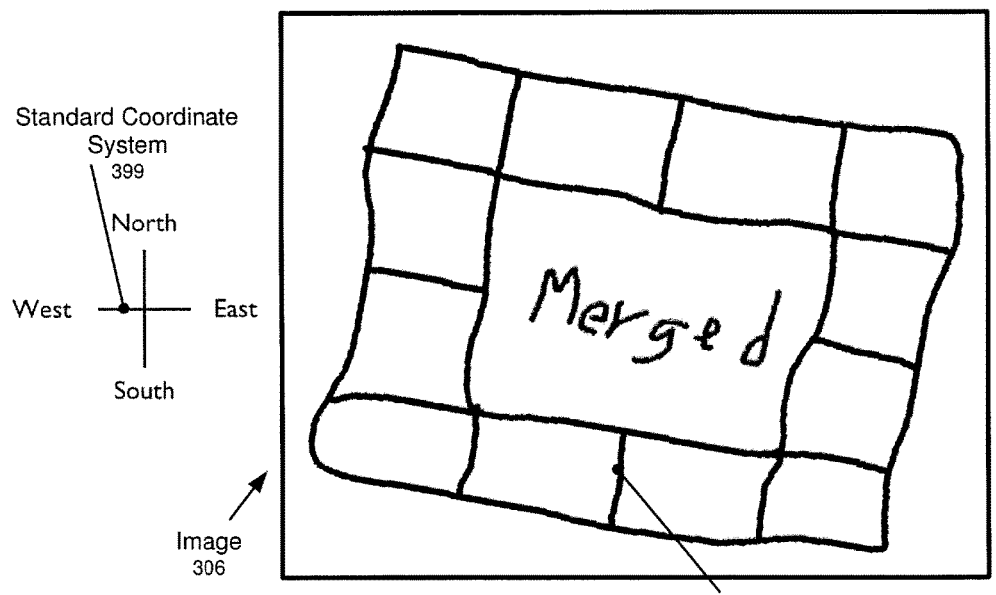
Figure 3B:
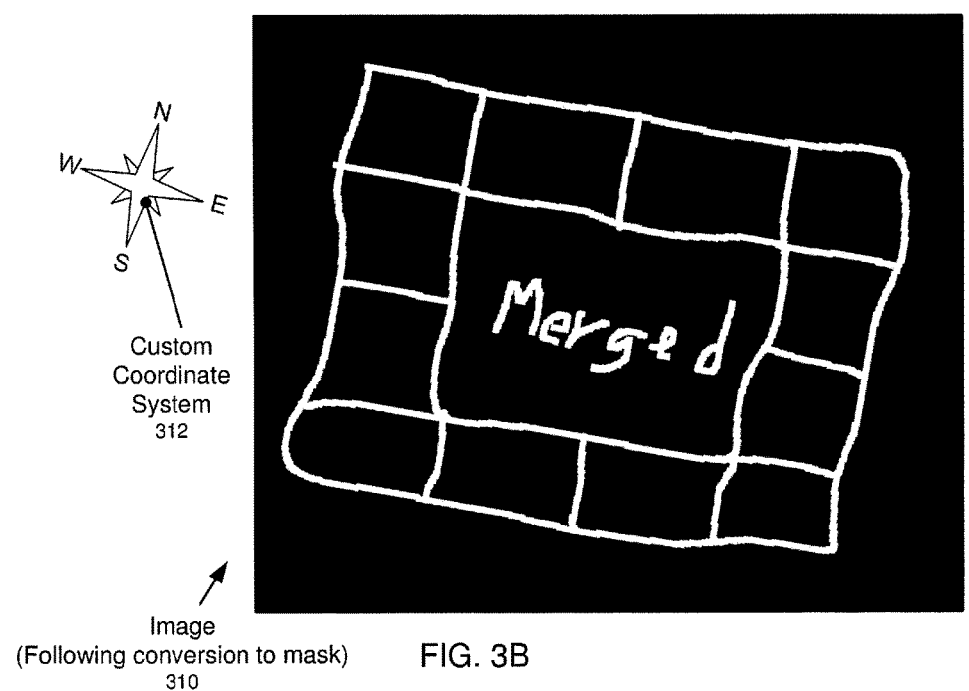

FIGS. 3A-3C show an implementation example in accordance with one or more embodiments of the invention. As shown in FIG. 3A, there exists an image (306) with a hand-drawn table (308). Specifically, the table (308) includes hand-drawn stokes that form the rows and columns. One or more cells of the table (308) may include text. The hand-drawn table (308) may be drawn at an angle. In other words, the table (308) is not aligned with the standard coordinate system (399) for the image (306).

FIG. 3B shows the image (310) after it has been converted to a mask. Moreover, a custom coordinate system (312) has been established. This custom coordinate system (312) has axes that are better aligned with the rows and columns of the table (308) than the standard coordinate system (399).

FIG. 3C shows a partial skeleton graph (314) for the table. As shown in FIG. 3C, the rows and columns of the table are formed by multiple hand-drawn strokes (316). The skeleton graph (314) includes a set of edges (395) and vertices that represent the hand-drawn table. Each edge (395) corresponds to a stroke (316), or a portion of a stroke, of the hand-drawn table and each vertex may correspond to an intersection (318) of two or more edges (395). In other words, the edges (395) are separated by the vertices. Further, each edge (395) contains a path of pixels from one end of the stroke (316) to the other end of the stroke (316), located approximately at the center of the stroke. In FIG. 3C, the width of the path is 1 pixel.

FIGS. 4A-4H show an implementation example in accordance with one or more embodiments of the invention.

Figure 4A:
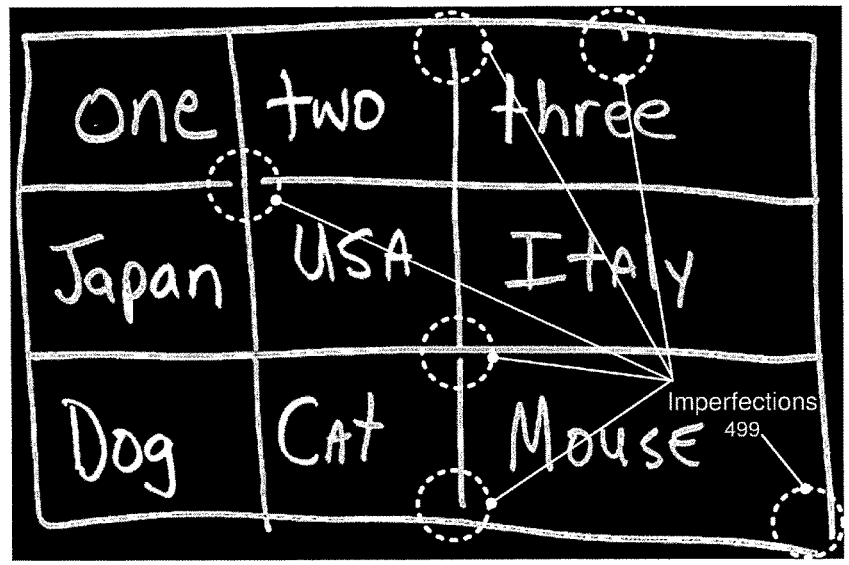

FIG. 4A shows the mask and skeleton for a hand-drawn table (402) similar to the image (310) and skeleton graph (314), as discussed above in reference to FIGS. 3B-3C. As seen in FIG. 4A, the hand-drawn table (402) includes multiple imperfections (499) that require repairing.

Figure 4B:
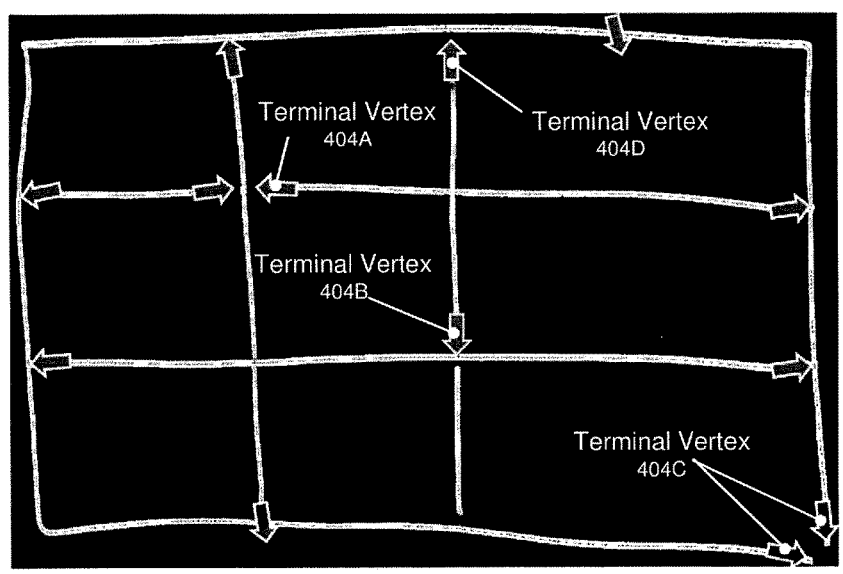

FIG. 4B shows the hand-drawn table (402) with some terminal vertices (404A, 404B, 404C, 404D) identified and the content of the cells removed (for readability). As discussed above, if the end of an edge is not connected to another edge, the pixel(s) at the end of the edge is referred to as a terminal vertex. Terminal vertex (404A), terminal vertex (404C), and terminal vertex (404D) are examples of this type of terminal vertex. As also discussed above, the intersection of only three edges is referred to as a T-intersection. The pixel(s) at the intersection of the three edges is also referred to as a terminal vertex. Terminal vertex (404B) is an example of this type of terminal vertex.

Figure 4C:
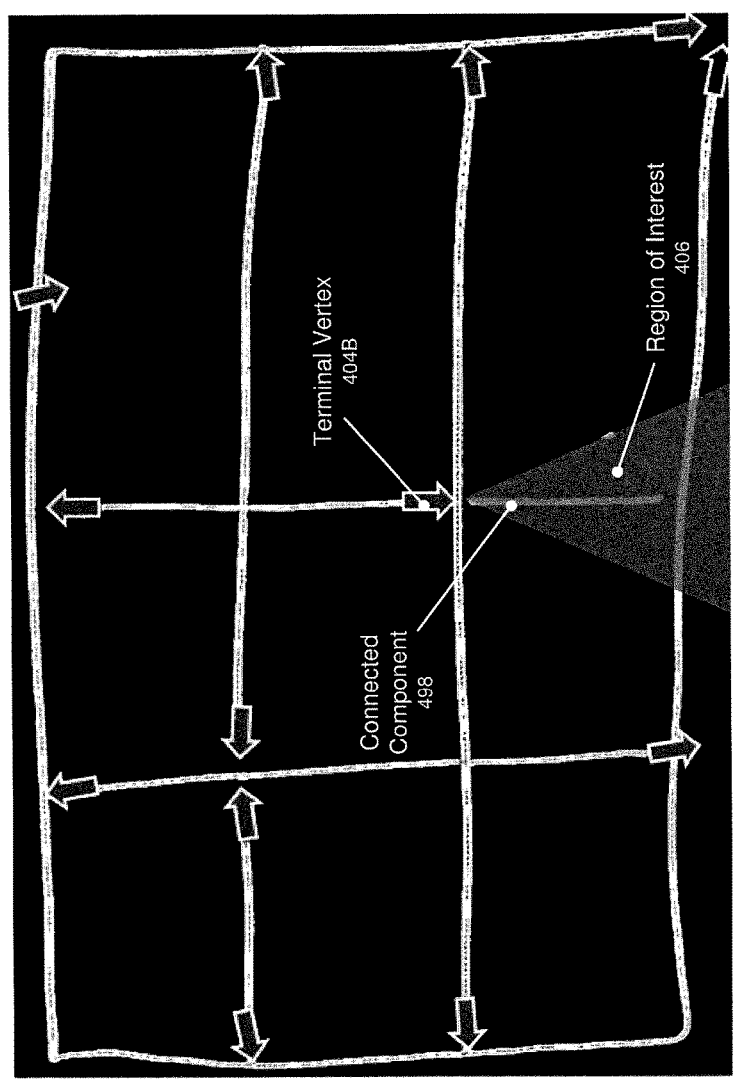

FIG. 4C shows the hand-drawn table (402) with a region of interest (406) identified for one of the terminal vertices (404B). In FIG. 4C, the region of interest (406) is illustrated as a triangular-shaped area in the trailing direction of the terminal vertex (404B). In the case of a terminal vertex that corresponds to a T-intersection, like terminal vertex (404B), the trailing direction is the direction of the vector that points to the pixel(s) at the intersection of the three edges, and starts on the stem of the T-intersection k pixels away from the intersection of the three edges. For example, k=5. Other values of k are also possible.

Although shown as a triangle in FIG. 4C, in one or more embodiments of the invention, the region of interest can have any shape (e.g., a circle, a cone, a triangle, a rectangle, a square, an ellipse) and the area covered by the region of interest is adjusted depending on how closely the table matches a template table with straight lines. For example, for hand-drawn tables that are well-drawn, the area covered by the region of interest may be smaller and vice versa.

As shown in FIG. 4C, there exists a connected component (498) within the region of interest (406). If the connected component (498) has not yet been skeletonized (i.e., a skeleton graph has not yet been generated for this connected component (498)), it may be skeletonized now in response to overlapping with the region of interest (406).

Figure 4D:
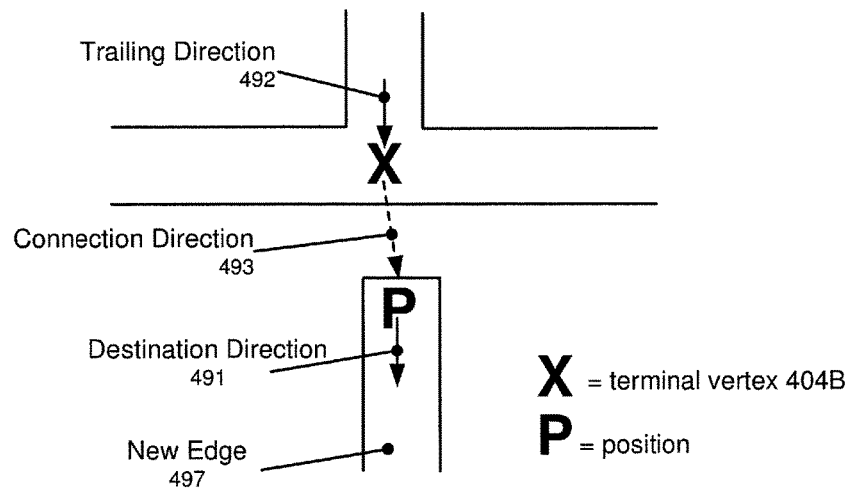

FIG. 4D shows a table repairing process as applied to the terminal vertex (404B) identified in FIG. 4C. In FIG. 4D, the connected component (498) has been skeletonized and is now shown as new edge (497). New edge (497) has multiple positions along its path of pixels that may be connected with terminal vertex (404B). The position closest to the terminal vertex (404B) is selected and the distance between the closest position and the terminal vertex (404B) is calculated. Further, the angle between the trailing direction (492) of the terminal vertex (404B) and the destination direction (491) of the closest position is calculated. The destination direction (491) for a position is the direction of the edge at the position away from the terminal vertex. This can be computed as the vector from the position to a location on the edge q pixels away from the position in the direction away from the terminal vertex. For example, q=10. Further still, the angle between the trailing direction (492) and the connection direction (493) for the position is also calculated. The connection direction is the direction of the vector connecting the terminal vertex and the position. A quality score is calculated for this potential artificial edge based on these two angles and the length of the potential artificial edge. The quality score reflects, in part, how closely the two angles match (i.e., how closely the trailing direction (492), the connection direction (493), and the destination direction (491) align to form a collinear connection). If the quality score exceeds a quality threshold, the position is selected as the target, and an artificial edge connecting the terminal vertex (404B) and the target is generated. The artificial edge is an edge following the connection direction (493).

In one or more embodiments, the quality threshold is adjusted based on how closely the table matches a template table having straight lines.

In one or more embodiments of the invention, the quality score for a collinear connection is calculated as:

quality_score=typeset_score×collinearity_score+(1−typeset_score)×gap_score.

The typeset_score represents how well the table matches a template table (i.e., a theoretical table with straight lines). For example, typeset_score may take on values between 0 and 1. A typeset_score of 0.98 indicates a very close match between the table and the template table.

Let dist=the distance between the terminal vertex and the position. Let len_stroke=the length of the stroke on which the terminal vertex is located. If dist≤len_stroke, then the gap_score=1. Otherwise, gap_score=max (0.0, (2*len_stroke−dist)/len_stroke).

The collinearity_score is calculated as the average of two scores (score1, score2) that assess how well: (i) the trailing direction and the connection direction align; and (ii) the trailing direction and the destination direction align. Let ang1=the angle in degrees between the trailing direction and the connection direction. Then, score1=max(0.0,)(90°−ang1)/90°. Let ang2=the angle in degrees between the trailing direction and the destination direction. Then, score2=max (0.0,)(90°−ang2)/90°. Finally, the collinearity_score=(score1+score2)/2.

Figure 4E:
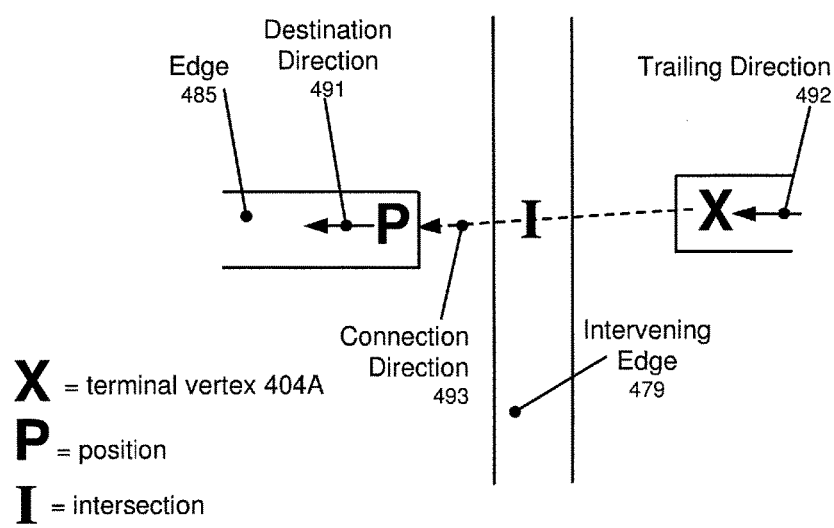

FIG. 4E shows a table repairing process as applied to terminal vertex (404A) identified in FIG. 4B. Edge (485) overlaps with the region of interest for terminal vertex (404A). Edge (485) has multiple positions that may be connected with terminal vertex (404A). The position closest to the terminal vertex (404A) on edge (485) is selected and the distance between the closest position and the terminal vertex (404A) is calculated. Further, the angle between the trailing direction (492) of the terminal vertex (404A) and the destination direction (491) of the closest position is calculated. The destination direction (491) for a position is the direction of the edge at the position away from the terminal vertex. This can be computed as the vector from the position to a location on the edge q pixels away from the position in the direction away from the terminal vertex. For example, q=8. Further still, the angle between the trailing direction (492) and the connection direction (493) for the position is also calculated. The connection direction is the direction of the vector connecting the terminal vertex and the position. A quality score is calculated for this potential artificial edge based on these two angles and the length of the potential artificial edge. The quality score reflects, in part, how closely the two angles match (i.e., how closely the trailing direction (492), the connection direction (493), and the destination direction (491) align to form a collinear connection). If the quality score exceeds a quality threshold, the position is selected as the target, and an artificial edge connecting the terminal vertex (404A) and the target is generated. The artificial edge is an edge following the connection direction (493).

FIG. 4E also shows an intervening edge (479) between the terminal vertex (404A) and the position. The artificial edge includes an intersection on the intervening edge (479). This intersection partitions the artificial edge into two portions, as discussed above. Although the distance between the intervening edge (493) and the terminal vertex is smaller than the distance between the position to the terminal vertex, the position is still selected as the target because collinear connections have a higher priority than perpendicular connections.

Figure 4F:
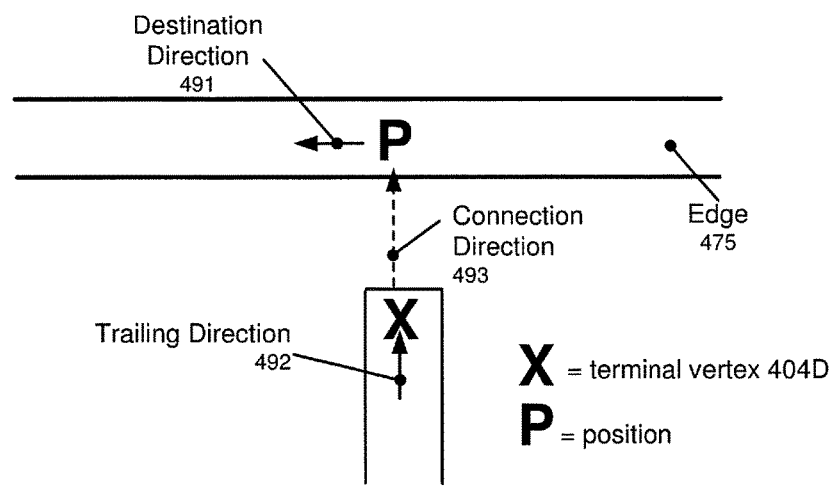

FIG. 4F shows a table repairing process as applied to terminal vertex (404D) identified in FIG. 4B. A portion of edge (475) overlaps with the region of interest for terminal vertex (404D). Edge (475) has multiple positions along its path of pixels that may be connected with terminal vertex (404D). The position closest to the terminal vertex (404D) on edge (475) is selected and the distance between the closest position and the terminal vertex (404D) is calculated. Further, the angle between the trailing direction (492) of the terminal vertex (404D) and the destination direction (491) of the closest position is calculated. The destination direction (491) for a position is the direction of the vector tangent to the edge's path of pixels at the position. A quality score is calculated for this potential artificial edge based on the angle and the length of the potential artificial edge. The quality score reflects, in part, how closely the angle matches 90 degrees (i.e., how closely the trailing direction (492) and the destination direction (491) intersect to form a perpendicular connection). If the quality score exceeds a quality threshold, the position is selected as the target, and an artificial edge connecting the terminal vertex (404D) and the target is generated. The artificial edge is an edge following the connection direction (493).

In one or more embodiments, the quality threshold is adjusted based on how closely the table matches a template table having straight lines.

In one or more embodiments of the invention, the quality score for a perpendicular connection is calculated as:

quality_score=typeset_score×perpendicularity_score+(1−typeset_score)×gap_score.

The typeset_score represents how well the table matches a template table (i.e., a theoretical table with straight lines). For example, typeset_score may take on values between 0 and 1. A typeset_score of 0.98 indicates a very close match between the table and the template table.

Let dist=the distance between the terminal vertex and the position. Let len_stroke=the length of the stroke on which the terminal vertex is located. If dist≤len_stroke, then the gap_score=1. Otherwise, gap_score=max (0.0, (2*len_stroke−dist)/len_stroke).

The perpendicularity_score reflects how closely the angle between the trailing direction and the destination direction resembles a right angle. Let ang=the angle in degrees between the trailing direction and the destination direction. If ang<90°, then the perpendicularity_score=ang/90°. If ang≥90°, then the perpendicularity_score=(180°−ang)/90°.

Figure 4G:
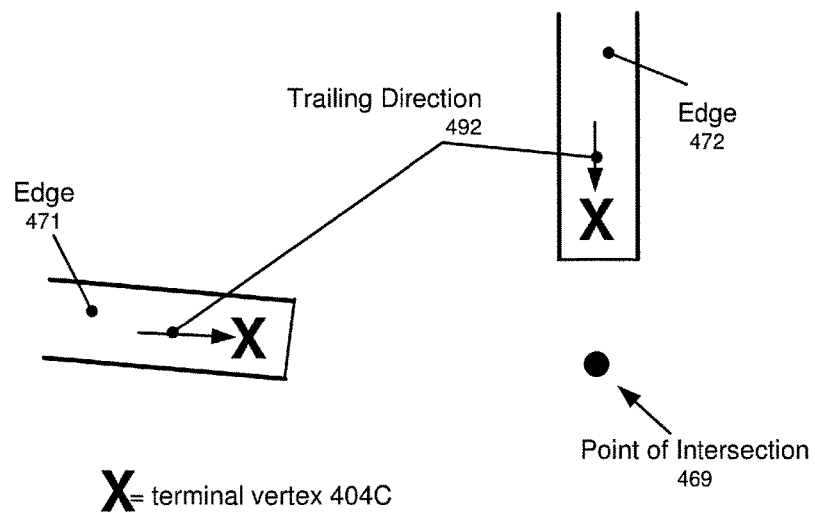

FIG. 4G shows a table repairing process for the hand-drawn table (402) where a corner connection is identified between two terminal vertices (404C) on two edges (471, 472), as identified in FIG. 4B. As shown in FIG. 4G, the trailing directions (492) of both terminal vertices (404C) are extended until a point of intersection (469) is identified. Further, an angle between the trailing directions (492) is calculated and compared with a corner angle range (e.g., 85-95). If the angle falls within the corner angle range, the point of intersection (469) is selected as the target, and two artificial edges connecting the two terminal vertices (404C) with the point of intersection (469) are generated.

In one or more embodiments, the corner angle range is adjusted based on how closely the table matches a template table having straight lines.

Figure 4H:
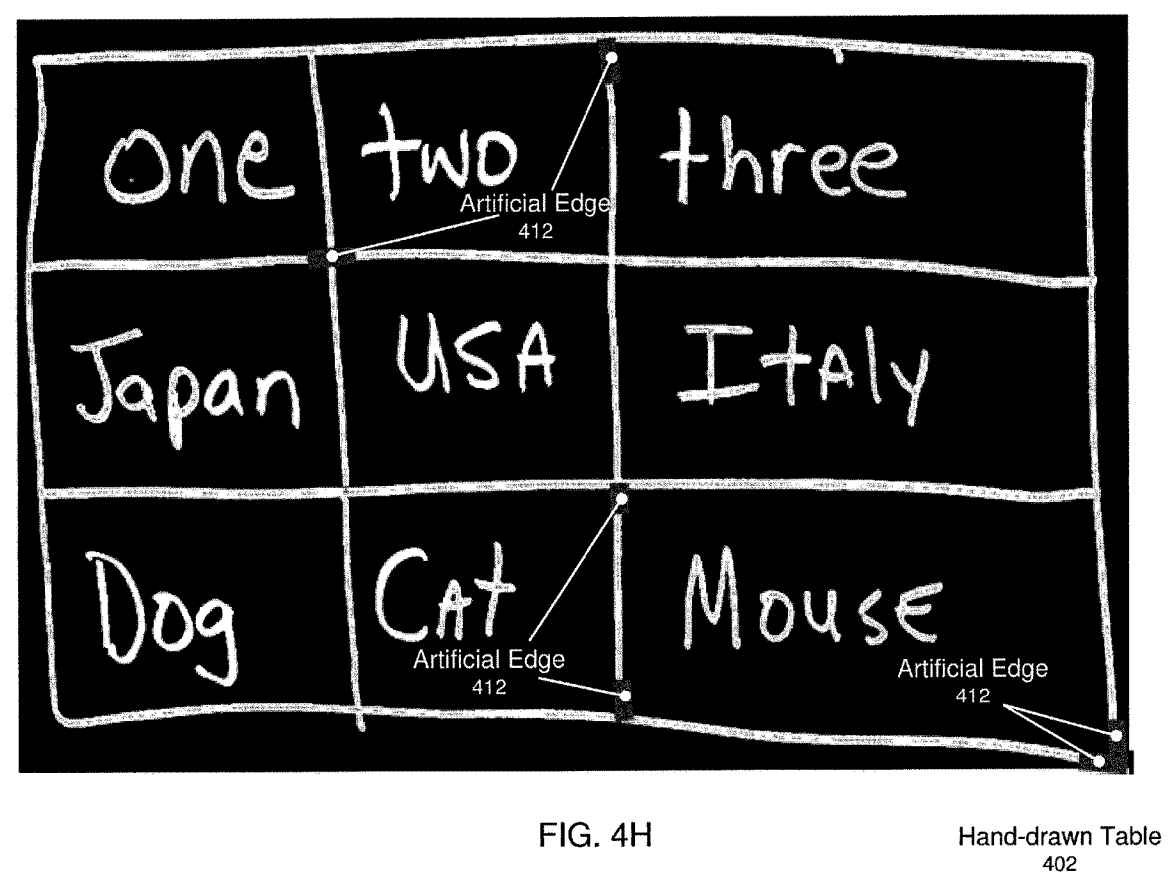

FIG. 4H shows the hand-drawn table (402) once the table repairing process has been completed. As seen in FIG. 4H, multiple artificial edges (412) have been generated and added to the skeleton graph to remove the imperfections. Specifically, the number of terminal vertices has been reduced. The table (402) shown in FIG. 4H is more suitable for further processing, including processes that attempt to generate a high-level representation of the table for inclusion in an electronic document (e.g., OOXML document, PDF document).

Figure 5A:
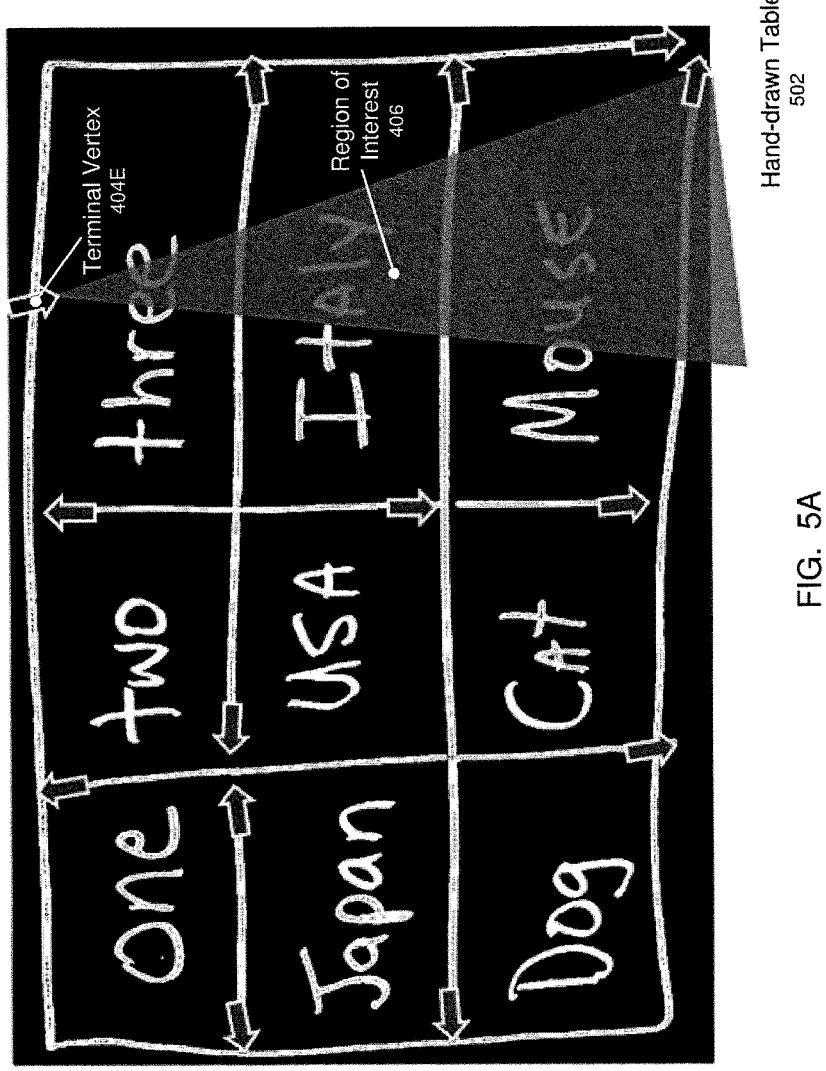
FIGS. 5A-5B show an implementation example in accordance with one or more embodiments of the invention.
Figure 5B:
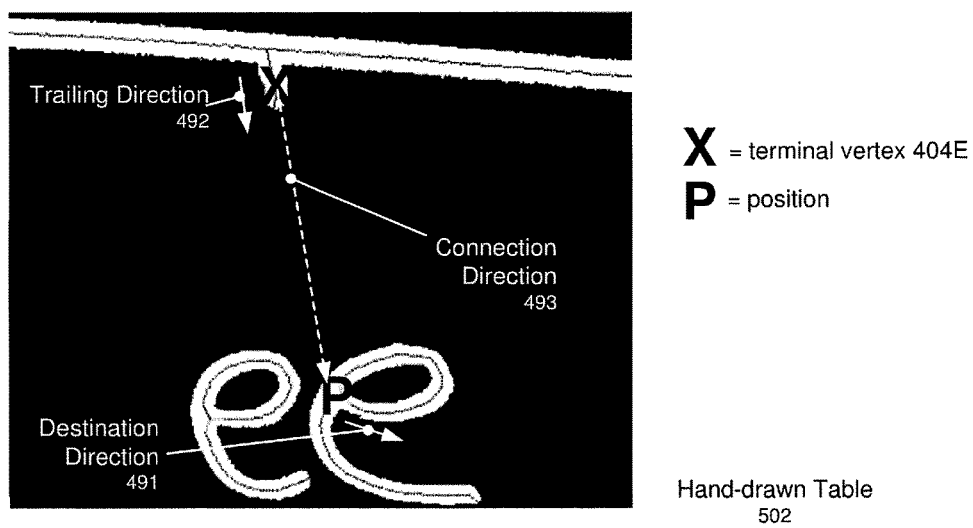

FIGS. 5A-5B show an implementation example in accordance with one or more embodiments of the invention. FIGS. 5A-5B show a table repairing process for the hand-drawn table (502) for a terminal vertex (404E) that cannot form a linear connection, a perpendicular connection, or a corner connection with any target. The hand-drawn table (502) is the same as the hand-drawn table (402), discussed above in reference to FIG. 4A.

As shown in FIG. 5A, multiple different edges of the hand-drawn table fall within the region of interest (406) of the terminal vertex (404E). However, none of the edges, when connected with the terminal vertex (404E), would accurately repair the hand-drawn table (502).

For example, as seen in FIG. 5B, the closest position for the terminal vertex (404E) is located on the text character "e". However, when a quality score is calculated for the potential artificial edge, this quality score falls below the quality threshold. As discussed above, the quality score may be a function of the length of the potential artificial edge and how closely the artificial edge forms a collinear or perpendicular connection with the position. Further still, there is no additional terminal vertex to form a corner with. Therefore, no target is selected, and no artificial edge is generated and added to the skeleton graph. The terminal vertex (404E) is removed from further consideration.

Although not shown in FIG. 5B, if the position were located on the tail of the same text character "e", the artificial edge between the terminal vertex and the position would intersect at least two edges (i.e., other portions of the same text character "e"). This would violate the intersection count and thus the artificial edge would be discarded without being added to the skeleton graph.

Figure 6:
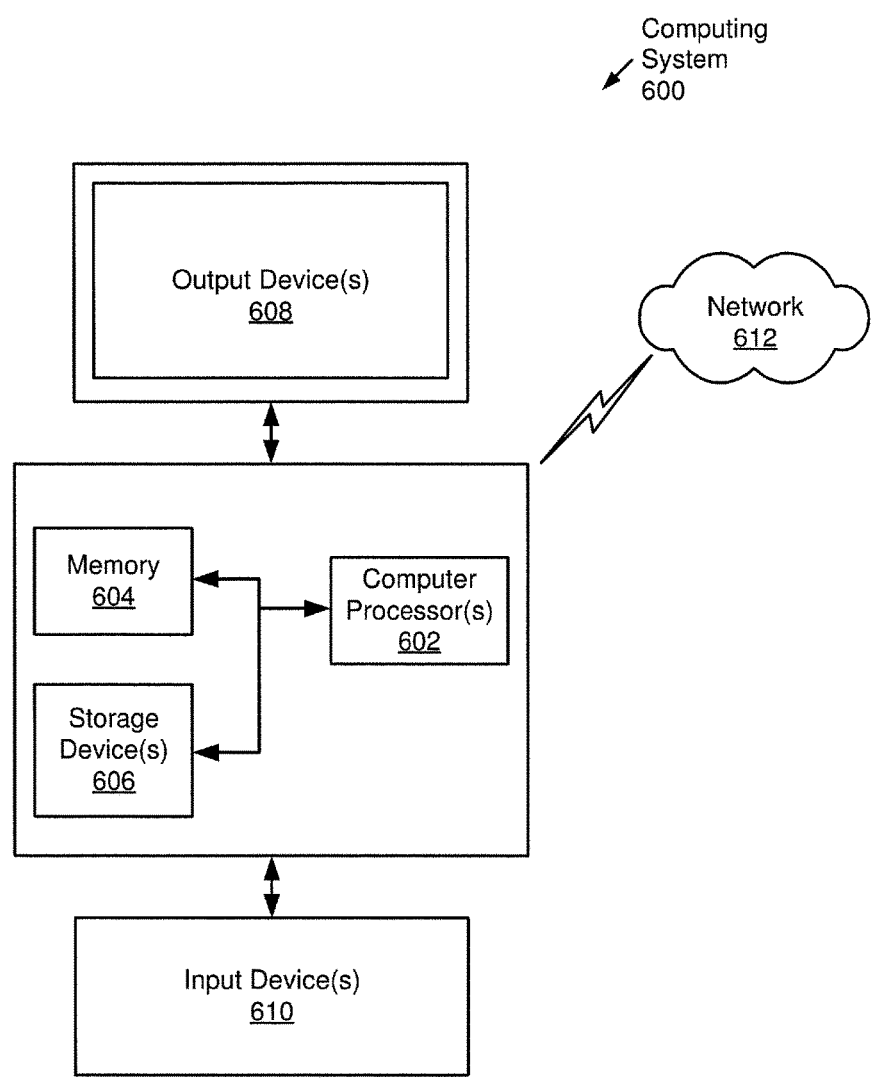
FIG. 6 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
obtaining an image comprising a table;
generating a skeleton graph associated with the table and comprising a plurality of edges;
identifying a first terminal vertex on the plurality of edges;
generating a first region of interest for the first terminal vertex;
determining a first target within the first region of interest; and
repairing the table by adding a first artificial edge between the first terminal vertex and the first target to the skeleton graph, wherein
determining the first target within the first region of interest comprises:
  identifying a first position within the first region of interest;
  calculating a first angle between a trailing direction of the first terminal vertex with a destination direction of the first position;
  calculating a second angle between the trailing direction and a connection direction linking the first terminal vertex and the first position;
  calculating a quality score for the first position based on the first angle, the second angle, and a distance between the first terminal vertex and the first position; and
  selecting, based on the quality score exceeding a quality threshold, the first position as the first target, and
the first artificial edge forms a collinear connection with the first position.

2. The method of claim 1, the method further comprising:
identifying a second terminal vertex on a T-intersection of only three edges of the plurality of edges;
generating a second region of interest for the second terminal vertex;
determining a second target within the second region of interest; and
repairing the table by adding a second artificial edge between the second terminal vertex and the second target to the skeleton graph.

3. The method of claim 1, further comprising:
identifying an edge of the plurality of edges between the first terminal vertex and the position;
determining the edge is perpendicular to the first artificial edge; and
partitioning the artificial edge into a first portion that links the first terminal vertex with the edge and a second portion that links the edge with the position.

4. The method of claim 1, further comprising:
identifying a second terminal vertex on the plurality of edges;
generating a second region of interest for the second terminal vertex;
identifying an edge of the plurality of edges overlapping with the second region of interest;
identifying a plurality of second positions on the edge and within the second region of interest;
calculating a plurality of distances between the second terminal vertex and the plurality of second positions;
selecting a closest position based on the plurality of distances;
calculating a third angle between a trailing direction of the second terminal vertex and a destination direction of the closest position;
calculating a quality score for the closest position based on the third angle and a distance between the closest position and the second terminal vertex;
selecting the closest position as a second target based on the quality score exceeding a quality threshold; and
repairing the table by adding a second artificial edge between the second terminal vertex and the second target to the skeleton graph,
wherein the second artificial edge forms a perpendicular connection with the edge.

5. The method of claim 1, further comprising:
identifying a second terminal vertex and a third terminal vertex on the plurality of edges;
calculating a third angle between a trailing direction of the second terminal vertex and a trailing direction of the third terminal vertex, wherein the trailing direction of the second terminal vertex and the trailing direction of the third terminal vertex intersect at a point;
generating a comparison by comparing the third angle with a corner angle range;
selecting, based on the comparison, the intersection point as a second target; and
adding, based on the comparison:
  a second artificial edge from the second terminal vertex to the second target to the skeleton graph; and
  a third artificial edge from the third terminal vertex to the intersection point to the skeleton graph.

6. The method of claim 1, further comprising:
identifying, before generating the skeleton graph associated with the table, a plurality of connected components forming the table,
wherein each of the plurality of connected components is one or more strokes in the table that does not share pixels with a different set of one or more strokes, and
wherein the skeleton graph is initially only generated for the largest connected component of the plurality of connected components.

7. The method of claim 6, further comprising:
generating a plurality of edges for a connected component in the first region of interest; and
adding the plurality of edges for the connected component to the skeleton graph in response to the first target being located on the connected component in the first region of interest.

8. The method of claim 7, further comprising:
determining, after adding the plurality of edges for the connected component to the skeleton graph, a new terminal vertex exists.

9. The method of claim 1, wherein the image comprises a writing board, and wherein the table is hand-drawn on the writing board with a marker.

10. A non-transitory computer readable medium (CRM) storing computer readable program code embodied therein that:
obtains an image comprising a table;
generates a skeleton graph associated with the table and comprising a plurality of edges;
identifies a first terminal vertex on the plurality of edges;
generates a first region of interest for the first terminal vertex;
determines a first target within the first region of interest; and
repairs the table by adding a first artificial edge between the first terminal vertex and the first target to the skeleton graph, wherein
determining the first target within the first region of interest further comprises:

identifying a first position within the first region of interest;
calculating a first angle between a trailing direction of the first terminal vertex with a destination direction of the first position;
calculating a second angle between the trailing direction and a connection direction linking the first terminal vertex and the first position;
calculating a quality score for the first position based on the first angle, the second angle, and a distance between the first terminal vertex and the first position; and
selecting, based on the quality score exceeding a quality threshold, the first position as the first target, and
the first artificial edge forms a collinear connection with the first position.

11. The non-transitory CRM of claim 10, further storing computer readable program code embodied therein that:
identifies a second terminal vertex on a T-intersection of only three edges of the plurality of edges;
generates a second region of interest for the second terminal vertex;
determines a second target within the second region of interest; and
repairs the table by adding a second artificial edge between the second terminal vertex and the second target to the skeleton graph.

12. The non-transitory CRM of claim 10, further storing computer readable program code embodied therein that:
identifies a second terminal vertex on the plurality of edges;
generates a second region of interest for the second terminal vertex;
identifies an edge of the plurality of edges overlapping with the second region of interest;
identifies a plurality of second positions on the edge and within the second region of interest;
calculates a plurality of distances between the second terminal vertex and the plurality of second positions;
selects a closest position based on the plurality of distances;
calculates a third angle between a trailing direction of the second terminal vertex and a destination direction of the closest position;
calculates a quality score for the closest position based on the third angle and a distance between the closest position and the second terminal vertex;
selects the closest position as a second target based on the quality score exceeding a quality threshold; and
repair the table by adding a second artificial edge between the second terminal vertex and the second target to the skeleton graph,
wherein the second artificial edge forms a perpendicular connection with the edge.

13. The non-transitory CRM of claim 10, further storing computer readable program code embodied therein that:
identifies a second terminal vertex and a third terminal vertex on the plurality of edges;
calculates a third angle between a trailing direction of the second terminal vertex and a trailing direction of the third terminal vertex, wherein the trailing direction of the second terminal vertex and the trailing direction of the third terminal vertex intersect at a point;
generates a comparison by comparing the third angle with a corner angle range;
selects, based on the comparison, the intersection point as a second target; and adds, based on the comparison:
a second artificial edge from the second terminal vertex to the second target to the skeleton graph; and
a third artificial edge from the third terminal vertex to the intersection point to the skeleton graph.

14. A system for image processing, comprising:
a memory; and
a computer processor connected to the memory that:
obtains an image comprising a table;
generates a skeleton graph associated with the table and comprising a plurality of edges;
identifies a first terminal vertex on the plurality of edges;
generates a first region of interest for the first terminal vertex;
determines a first target within the first region of interest; and
repairs the table by adding a first artificial edge between the first terminal vertex and the first target to the skeleton graph, wherein
determining the first target within the first region of interest further comprises:
identifying a first position within the first region of interest;
calculating a first angle between a trailing direction of the first terminal vertex with a destination direction of the first position;
calculating a second angle between the trailing direction and a connection direction linking the first terminal vertex and the first position;
calculating a quality score for the first position based on the first angle, the second angle, and a distance between the first terminal vertex and the first position; and
selecting, based on the quality score exceeding a quality threshold, the first position as the first target, and
the first artificial edge forms a collinear connection with the first position.

15. The system of claim 14, wherein the processor also:
identifies a second terminal vertex on a T-intersection of only three edges of the plurality of edges;
generates a second region of interest for the second terminal vertex;
determines a second target within the second region of interest; and
repairs the table by adding a second artificial edge between the second terminal vertex and the second target to the skeleton graph.

16. The system of claim 14, wherein the processor also:
identifying a second terminal vertex on the plurality of edges;
generating a second region of interest for the second terminal vertex;
identifies an edge of the plurality of edges overlapping with the second region of interest;
identifies a plurality of second positions on the edge and within the second region of interest;
calculates a plurality of distances between the second terminal vertex and the plurality of second positions;
selects a closest position based on the plurality of distances;
calculates a third angle between a trailing direction of the second terminal vertex and a destination direction of the closest position;

calculates a quality score for the closest position based on the third angle and a distance between the closest position and the second terminal vertex;

selects the closest position as a second target based on the quality score exceeding a quality threshold; and repair the table by adding a second artificial edge between the second terminal vertex and the second target to the skeleton graph wherein the second artificial edge forms a perpendicular connection with the edge.

17. The system of claim 14, wherein the processor also:

identifies a second terminal vertex and a third terminal vertex on the plurality of edges;

calculates a third angle between a trailing direction of the second terminal vertex and a trailing direction of the third terminal vertex, wherein the trailing direction of the second terminal vertex and the trailing direction of the third terminal vertex intersect at a point;

generates a comparison by comparing the third angle with a corner angle range;

selects, based on the comparison, the intersection point as a second target; and adds, based on the comparison:
- a second artificial edge from the second terminal vertex to the second target to the skeleton graph; and
- a third artificial edge from the third terminal vertex to the intersection point to the skeleton graph.

* * * * *